United States Patent [19]

Chen et al.

[11] 4,259,174

[45] Mar. 31, 1981

[54] CATALYTIC DEWAXING OF HYDROCARBON OILS

[75] Inventors: Nai Y. Chen, Titusville; William E. Garwood, Haddonfield, both of N.J.

[73] Assignee: Mobil Oil Corporation, Fairfax, Va.

[21] Appl. No.: 21,735

[22] Filed: Mar. 19, 1979

[51] Int. Cl.$^3$ .................... C10G 1/04; C10G 11/05; C10G 21/00; C10G 47/16

[52] U.S. Cl. .................... 208/111; 208/18; 208/57; 208/87; 208/120; 585/751

[58] Field of Search .................... 208/111, 18, 59, 87, 208/120; 585/751

[56] References Cited

U.S. PATENT DOCUMENTS

| | | | |
|---|---|---|---|
| Re. 28,398 | 4/1975 | Chen et al. | 208/111 |
| 2,817,693 | 12/1957 | Koome et al. | 585/751 X |
| 3,474,025 | 10/1969 | Garwood | 208/111 |
| 3,578,398 | 5/1971 | Jenkins | 208/111 X |
| 3,687,839 | 8/1972 | Jenkins | 208/111 |
| 3,700,585 | 10/1972 | Chen et al. | 208/111 |
| 3,755,138 | 8/1973 | Chen et al. | 208/33 |
| 3,764,516 | 10/1973 | Steinmetz et al. | 208/27 |
| 3,968,024 | 7/1976 | Gorring et al. | 208/111 |
| 4,176,050 | 11/1979 | Chen et al. | 208/111 |

FOREIGN PATENT DOCUMENTS 934130 of 0000 Canada .................... 423/328

*Primary Examiner*—Delbert E. Gantz
*Assistant Examiner*—G. E. Schmitkons
*Attorney, Agent, or Firm*—C. A. Huggett; V. J. Frilette

[57] ABSTRACT

Hydrocarbon oils, especially waxy distillate lubricating oil stocks suitable for the preparation, by conventional unit processes, of high V.I., low pour point lubricating oils, are advantageously catalytically dewaxed with synthetic offretite catalyst preferably associated with a hydrogenation metal such as platinum or palladium.

15 Claims, No Drawings

CATALYTIC DEWAXING OF HYDROCARBON OILS

BACKGROUND OF THE INVENTION

1. Field of the Invention

This invention is concerned with a novel process for catalytically dewaxing a hydrocarbon oil to reduce its pour point. In particular, it is concerned with dewaxing petroleum oil such as a whole crude, a reduced crude, or a distillate fraction thereof by catalytic contact with synthetic offretite. It is further concerned with a process for manufacturing low pour point distillate fuels. It is still further concerned with a process for manufacturing a high V.I. distillate lubricating oil stock of low pour point by catalytically dewaxing suitable distillate stock with synthetic offretite catalyst.

2. Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structures and structure types. This complexity and its consequences are referred to in "Petroleum Refinery Engineering," by W. L. Nelson, McGraw Hill Book Company, Inc., New York, N.Y., 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having somewhat different properties. Or, the refined lubricant stock, prior to use as a lubricant, may be compounded with one or more additives which function, for example, as antioxidants, extreme pressure additives, and V.I. improvers. As used herein, the term "stock," regardless whether or not the term is further qualified, will refer only to a hydrocarbon oil without additives. The term "raw stock" will be used herein to refer to a viscous distillate fraction of crude petroleum oil isolated by vacuum distillation of a reduced crude from atmospheric distillation, and before further processing, or its equivalent. The term "solvent-refined stock" will refer to an oil that has been solvent refined, for example with furfural. The term "dewaxed stock" will refer to an oil which has been treated by any method to remove or otherwise convert the wax contained therein and thereby reduce its pour point. The term "waxy," as used herein will refer to an oil of sufficient wax content to result in a pour point greater than +25° F. The term "stock," when unqualified, will be used herein generically to refer to the viscous fraction in any stage of refining, but in all cases free of additives.

Briefly, for the preparation of a high grade distillate lubricating oil stock, the current practice is to vacuum distil an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, or chlorex, which is selective for aromatic hydrocarbons, and which removes undesirable components. The raffinate from solvent refining is then dewaxed, for example by admixing with a solvent such as a blend of methyl ethyl ketone and toluene. The mixture is chilled to induce crystallization of the paraffin waxes which are then separated from the dissolved oil, and the dewaxed raffinate is then recovered by removal of the solvent.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This Index is a series of numbers ranging from 0 to 100 or more which indicate the rate of change of viscosity with temperature. A viscosity index of 100 indicates an oil that does not tend to become viscous at low temperature or become thin at high temperatures. Measurement of the kinematic viscosities of an oil at 40° and 100° C., and referral to established correlations, provides a measure of the V.I. of the oil. For purposes of the present invention, whenever V.I. is referred to it is meant the V.I. as determined by the ASTM Method D2270-77, published by ASTM, 1916 Race Street, Philadelphia 3, Pa., or equivalent, and accompanying tables, incorporated herein by reference.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. (See Nelson, supra, pages 80-81 for classifications of crude oils). Suitable stocks for high V.I. oils, however, also contain substantial quantities of waxes which result in solvent-refined lubricating oil stocks of high pour point, i.e., a pour point substantially greater than +25° F. Thus, in general, the refining of crude oil to prepare acceptable high V.I. distillate stocks ordinarily includes dewaxing to reduce the pour point to not greater than +25° F. The refiner, in this step, often produces saleable paraffin wax by-product, thus in part defraying the high cost of the dewaxing step.

Raw distillate lubricating oil stocks usually do not have a particularly high V.I. However, solvent-refining, as with furfural for example, in addition to removing unstable and sludge-forming components from the crude distillate, also removes components which adversely affect the V.I. Thus, a solvent refined stock prior to dewaxing usually has a V.I. well in excess of specifications. Dewaxing, on the other hand, removes paraffins which have a V.I. of about 200, and thus reduces the V.I. of the dewaxed stock.

In recent years catalytic techniques have become available for dewaxing of petroleum stocks. A process of that nature developed by British Petroleum is described in The Oil and Gas Journal dated Jan. 6, 1975, at pages 69-73. See also U.S. Pat. No. 3,668,113.

In reissue patent 28,398 to Chen, et al is described a process for catalytic dewaxing with a catalyst comprising zeolite ZSM-5. Such processes combined with catalytic hydrofinishing is described in U.S. Pat. No. 3,894,938. In U.S. Pat. No. 3,755,138 to Chen et al is described a process for mild solvent dewaxing to remove high quality wax from a lube stock, which is then catalytically dewaxed to specification pour point. The Examiner's attention also is called to the Chen et al U.S. patent application Ser. No. 966,419 now U.S. Pat. No. 4,176,050 filed Dec. 4, 1978 wherein macrocrystalline ZSM-5 is utilized in a process for dewaxing lube oil base stock. The entire contents of these patents and application are herein incorporated by reference. Special attention is called to U.S. Pat. No. 3,474,025 wherein a zeolite called "offretite" is used for selective cracking of paraffins. The term "offretite" was used therein to refer to natural erionite, according to the nomenclature change suggested in Mineral Mag. 33, pp. 66-7 (1962).

It is interesting to note that catalytic dewaxing, unlike prior-art dewaxing processes, although subtractive, is not a physical process but rather depends on transforming the straight chain and other waxy paraffins to non-wax materials. The process, however, is more economical and thus of industrial interest, even though at least some loss of saleable wax is inherent. Commercial interest in catalytic dewaxing is evidence of the need for more efficient refinery processes to produce low pour point lubricants.

It is an object of this invention to provide a process of improved selectivity for catalytically dewaxing a hydrocarbon oil. It is another object of this invention to provide a method for removing paraffin waxes from a distillate lubricating oil stock with reduced loss of V.I. These and other objects will become apparent to one skilled in the art on reading this entire specification including the claims appended hereto.

BRIEF DESCRIPTION OF THE INVENTION

It has now been found that catalytic dewaxing of a hydrocarbon oil, particularly a distillate petroleum fraction characterized by a pour point of greater than +25° F., is advantageously achieved by utilizing as catalyst the hereinbelow described synthetic offretite under process conditions more particularly described hereinbelow. The dewaxed oil so produced is recovered in increased yield and has a V.I. measurably higher than that obtained with prior art catalysts. In a particularly preferred embodiment, the synthetic offretite is in the hydrogen form and is employed in conjunction with a hydrogenation component such as platinum or palladium, and in the presence of hydrogen.

DETAILED DESCRIPTION OF THE INVENTION

In the description which follows, particular reference will be made to the preparation of hydrocarbon lubricating oil stocks from suitable crude petroleum fractions. Within this context, a suitable crude petroleum, for purposes of this invention, is one from which may be prepared (i.e., contains) a dewaxed lubricating oil having a V.I. of at least about 85, and a pour point not greater than +25° F., by conventional methods of distillation, solvent refining and dewaxing. Also contemplated as within the scope of this invention for use as feed thereto is any hydrocarbon lubricating oil stock boiling within the range of from about 450, and preferably from about 600 to about 1050° F., and capable of yielding significant amounts of dewaxed lubricating oil having a V.I. of at least about 85 and a pour point not greater than +25° F. Thus, hydrocracked petroleum oils having the foregoing characteristics are included within the scope of this invention, as well as are other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention, the raw stock hereinabove described is solvent refined by counter current extraction with at least an equal volume (100 vol.%) of a selective solvent such as furfural. It is preferred to use 1.5 to 2.5 volumes of solvent per volume of oil. The raffinate is subjected to catalytic dewaxing by mixing with hydrogen and contacting at 500 to about 750° F. with a catalyst comprising a hydrogenation metal and synthetic offretite. The catalytic dewaxing is conducted at a liquid hourly space velocity (LHSV) of 0.1 to 5.0 volumes of charge oil per volume of catalyst per hour.

In some instances it may be desirable to partially dewax the solvent-refined stock by conventional solvent dewaxing techniques, say to a pour point from 10 to about 50° F., and preferably to a pour point greater than about +25° F., prior to catalytic dewaxing. The higher melting point waxes so removed are those of greater hardness and higher market value than the waxes removed in taking the product to a still lower pour point.

The cracked fragments from cracking wax molecules in the catalytic dewaxer will have adverse effects on flash and fire points of the product and preferably are therefore removed by distillation of the product to flash and fire point specifications. Additionally, as will be more specifically illustrated below, topping the raffinate dewaxed with the catalyst herein described appears to augment the V.I.

The catalytic dewaxing step of this invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. With such configuration, it is of considerable importance in order to obtain maximum benefits from this invention to initiate the reaction with fresh catalyst at a relatively low temperature such as 500° to 600° F. This temperature is of course raised as the catalyst ages, in order to maintain catalytic activity. In general, for lube oil base stocks the run is terminated at an end-of-run temperature of about 750° F., at which time the catalyst may be regenerated by contact at elevated temperature with hydrogen gas, for example, or by burning in air or other oxygen-containing gas.

In general, for the purpose of manufacturing a refined lubricating oil stock according to this invention, the dewaxing step is conducted at a LHSV of from 0.1 to 5.0, a temperature from about 500° to about 750° F., and at a pressure of about 200 to 2000 psig. Contacting is preferably done in the presence of hydrogen. Most preferably the offretite catalyst is composited with zinc or a hydrogenation metal selected from Group VIII of the Periodic Table.

Synthetic offretite is a well-defined zeolite, with a known X-ray diffraction pattern and a proposed crystal structure. The structure is stable on dehydration, and the dehydrated structure has pores sufficiently large to admit hydrocarbons such as normal paraffins and thus behaves as a "molecular sieve." The synthetic offretite useful for the present invention is not to be confused with erionite, a closely-related mineral, or with zeolite T which is an intergrowth of erionite and offretite.

Synthetic offretite useful in the present invention may be prepared by the method described in Canadian Pat. No. 934,130 to Rubin or in U.S. Pat. No. 3,578,398 to Jenkins, the entire contents of which are herein incorporated by reference.

The offretite useful in this invention is a crystalline aluminosilicate having a composition, in terms of mole ratios of oxides, as follows:

$$(1.1\pm0.4)M_{2/n}O:Al_2O_3:5-8SiO_2:zH_2O$$

wherein M is a cation other than a mixture of sodium and potassium, n is the valence of said cation, and z is between 0 and 8 and having an X-ray powder diffraction pattern substantially the same as that shown in Table I below. The zeolite has the ability to sorb cyclohexane in amounts at least about 1.5 percent by weight at 25° C. and 20 mm. Hg. It can also sorb up to and including 7.2 weight percent n-hexane.

The composition in its as synthesized form can be expressed in terms of mole ratios of oxides as follows:

$$(1.1\pm0.4)[xR_2O:(1-x)M_{2/n}O]:Al_2O_3:5-8SiO_2:zH_2O$$

wherein n and z have the previously assigned significance, x is between 0.001 and 0.5, R is tetramethylammonium and M is a mixture of sodium and potassium. In this regard it is to be understood that the mixture can also include lithium.

The as synthesized form of the composition can undergo ion exchange to exchange at least a portion of the original cations for other cations in which case the composition can be represented in terms of mole ratios of oxides as follows:

$$(1.1\pm0.4)M_{2/n}O:Al_2O_3:5-8SiO_2:zH_2O$$

wherein n and z have the previously assigned significance and M is selected from the group consisting of tetramethylammonium, hydrogen, ammonium and metals and other than a mixture of sodium and potassium. Preferably M is a cation other than an alkali metal cation. Particularly desirable metal cations are those in which that form of the composition has catalytic activity. These include metals of Group II and Group VIII of the Periodic Table and manganese. Of the Group II metals, zinc is preferred especially in a form wherein some of the cation sites are occupied by a hydrogen ion. Where M is hydrogen or an ammonium species, the zeolite may be activated by thermal treatment at a temperature of at least 700° F. to about 1600° F.

The offretite catalyst useful in this invention may be composited with a binder such as alumina, silica, silica-alumina, silica-titania, silica-zirconia, or a clay such as kaolin, and the zeolite also can be used in intimate combination with a hydrogenating component such as tungsten, vanadium, molybdenum, rhenium, nickel, cobalt, chromium, manganese, or a noble metal such as platinum or palladium where a hydrogenation/dehydrogenation function is to be performed, i.e., shape selective hydrocracking. Such component can be exchanged into the composition, impregnated therein or physically intimately admixed therewith. Such component can be impregnated in or onto zeolite such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation of cationic complex, e.g., $Pt(NH_2)_4Cl_2$ is particularly useful.

The zeolite useful as catalyst, as indicated above, has the crystal structure of offretite, as distinguished from erionite and Linde zeolite T. X-ray analysis of the novel composition reveals that it is free of the "stacking faults" which distinguish offretite from erionite and zeolite T. The composition of this invention has the following characteristic X-ray diffraction pattern whose values are:

TABLE I

| 2 times theta | Relative Intensity $I/I_o$ | Interplanar Spacing, d(A) |
|---|---|---|
| 7.7 | 100 | 11.45 |
| 11.75 | 16.5 | 7.54 |
| 13.4 | 55.2 | 6.63 |
| 14.05 | 9.9 | 6.30 |
| 15.43 | 15.0 | 5.74 |
| 19.42 | 26.5 | 4.57 |
| 20.47 | 43.3 | 4.34 |
| 23.7 | 89.2 | 3.76 |
| 24.85 | 43.0 | 3.59 |
| 26.9 | 18.6 | 3.31 |
| 28.3 | 17.4 | 3.15 |
| 30.5 | 9.5 | 2.93 |
| 31.35 | 79.7 | 2.85 |
| 33.32 | 19.1 | 2.68 |
| 35.90 | 13.8 | 2.51 |

These values are determined by standard techniques. In order to verify the absence or presence of odd "l" lines, a step or slow scan technique was used. The radiation was the K-alpha doublet of copper, and a Geiger counter spectrometer with a strip chart pen recorder was used. The scan speed was ½ degree 2 theta per minute. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs), the interplanar spacing in angstroms, corresponding to the recorded lines, were calculated. In Table I the relative intensities are given numerically. It should be understood that the X-ray diffraction pattern is charracteristic of all the species of the novel composition, including those wherein the sodium and/or potassium ion has been exchanged as by base exchange with another cation or cations.

This exchanged composition has substantially the same X-ray diffraction pattern as that set forth in Table I above. The "stacking faults" referred to above which exist in other crystalline aluminosilicates reveal what crystallographers call odd "l" lines in their X-ray diffraction patterns, occurring at the interplanar spacings in angstroms of 9.18, 5.34 and 4.16 corresponding to 2 times theta values of 9.63, 16.55 and 21.35, respectively. Thus, the offretite useful in the present invention is characterized by a crystal structure substantially free of stacking faults.

The reason for the improved selectivity and increased yield obtained with synthetic offretite is not well understood. However, it is known that this zeolite has an effective pore size which is intermediate between the 5 Angstrom pore of zeolite 5A and the 10 to 13 Angstrom pore of the faujasite type zeolites, a puckered 12-membered oxygen ring equivalent to a planar 9-membered ring forming said pore opening. By virtue of this pore structure, straight chain hydrocarbons probably are selectively converted within the pores of the catalyst. It has been observed that synthetic offretite may be somewhat less active than the prior art ZSM-5 catalyst. However, the improved selectivity and yield offsets this disadvantage which may be compensated for by somewhat higher process temperature.

Although this invention has been described in the foregoing paragraphs with particular reference to the manufacture of high V.I. distillate lube stock, it is contemplated as within the scope of this invention to catalytically dewax any waxy hydrocarbon oil including crude petroleum, jet fuel, kerosene and other distillate fuels by contact with the offretite catalyst herein described. Such stocks may be dewaxed in the absence of hydrogen at a liquid hourly space velocity (LHSV) of 0.2 to 50, a temperature of 500° F. to 1100° F. and a pressure of 15 to 3000 psig. It is preferred, however, to operate the dewaxing process in the presence of hydrogen, with the offretite catalyst in the hydrogen form and associated with a hydrogenation component such as platinum, palladium, or zinc. Other hydrogenation components selected from Group VIII of the Periodic Table may be used. Preferred hydrogenation components are selected from the group consisting of platinum, palladium, zinc, and a mixture of palladium and zinc.

Preferred reaction conditions for the dewaxing step when operating with hydrogen include, in combination, a temperature of 500° to 900° F., a pressure of 200 to 2000 psig, and a LHSV of 0.2 to 30 with a hydrogen circulation rate of 500 to 20,000 SCF/bbl (standard cubic feet per barrel of feed). The combination of reaction conditions are chosen such as to effect a reduction of the pour point, or the cloud point, or the CFPP (cold filter plugging point) of the feed of at least 5° F., and preferably at least 10° F. The terms pour point, cloud point, and CFPP refer to those characteristics of the feed and product as defined by test procedures currently specified by the American Society for Testing Materials.

The actual process conditions selected for the process of this invention will of course depend on the nature and wax content of the feed, and the specifications for the product. In general, however, it is a feature of this invention that most usually not more than about 20 wt.% of the feed is converted to dewaxed product boiling lower than the feed.

As has heretofore been pointed out, the novel process of this invention is concerned with dewaxing of hydrocarbon feedstocks. The term "dewaxing" as used in the specification and claims is used in its broadest sense and is intended to mean the removal of those hydrocarbons which readily solidify (waxes) from petroleum stocks.

The improved process of this invention will now be illustrated by examples which are not to be construed as limiting the invention as described in this specification including the attached claims. All parts and proportions in these examples are by weight unless explicitly stated to be otherwise.

EXAMPLE 1

Synthetic offretite was prepared according to Canadian Pat. No. 934,130 to Rubin. Its ammonium form was calcined and converted to the hydrogen form by treatment overnight at 900° F. in hydrogen gas. Ten cubic centimeters of 30-60 mesh catalyst was charged to a ½ inch diameter reactor.

The lube oil chargestock was a partially solvent-dewaxed, solvent-refined oil having the following properties:

TABLE II

| Chargestock Properties | |
|---|---|
| | Charge |
| Gravity, °API | 30.6 |
| Specific gravity | 0.8729 |
| Pour Point °F. | +45 |
| K.V. @ 40° C. cs. | 29.08 |
| K.V. @ 100° C., cs. | 5.01 |
| V.I. | 108 |
| Flash Point, °F. (C.O.C.) | 420 |

The dewaxing conditions and the product properties are given in Table III.

TABLE III

| Results | | | |
|---|---|---|---|
| Material Balance, hours | 19.5 | 21 | 18 |
| Time on Stream, days | 4.4 | 5.3 | 6.1 |
| Pressure, psig | 1000 | 1000 | 1000 |
| LHSV | 0.5 | 0.5 | 0.5 |
| H$_2$, SCF/bbl | 5000 | 5000 | 5000 |
| Average Catalyst Temp., °F. | 650 | 700 | 750 |
| Liquid Product, °API | 32.4 | 32.9 | 33.2 |
| Material Balance, wt. % | 97.9 | 101.2 | 94.8 |
| Yields, wt. % (NLB) | | | |
| C$_1$ + C$_2$ | 0.1 | 0.3 | 1.0 |
| C$_3$ | 2.0 | 4.2 | 6.4 |
| C$_4$ | 0.9 | 1.5 | 1.5 |
| C$_5$ | 0.3 | 0.3 | 0.3 |
| C$_6$-610° F. | 0.6 | <0.1 | 1.7 |
| 610° F.+ Lube | 96.2 | 93.7 | 89.1 |
| Lube Properties | 610° F.+ | 610° F.+ | 610° F.+ |
| Gravity, °API | 30.9 | 31.0* | 31.0* |
| Specific Gravity | .8713 | .8708 | .8708 |
| Pour Point, °F. | +25 | +10 | +5 |
| KV @ 40° C., cs | 28.18 | 27.99 | 27.92 |
| KV @ 100° C., cs | 5.03 | 4.94 | 4.94 |
| Viscosity Index | 104 | 99 | 100 |
| V.I. adjusted to +5° F. Pour | 100 | 98 | 100 |

*Estimated values

EXAMPLE 2

The +10° F. and +5° F. pour point products of Example 1 were topped to remove 5 volume % of the light end. For comparison purposes a +5° F. pour oil prepared by a similar process to that used in Example 1 but with prior art ZSM-5 catalyst also was topped to about the same extent. The offretite-dewaxed oil increased in V.I. on topping while the oil made from the prior art catalyst decreased in V.I., as shown in Table IV.

TABLE IV

Effect of Topping on V.I.

|  | Offretite |  | ZSM-5 |
|---|---|---|---|
| 610° F.+ Lube, Pour |  |  |  |
| Point, °F. | +10 | +5 | +5 |
| KV @ 40° C., cs | 27.99 | 27.92 | 31.65 |
| KV @ 100° C., cs | 4.94 | 4.94 | 5.30 |
| Viscosity Index | 99 | 100 | 98 |
| 95% Bottoms |  |  |  |
| KV @ 40° C., cs | 30.65 | 29.74 | 34.66 |
| KV @ 100° C., cs | 5.26 | 5.16 | 5.57 |
| Viscosity Index | 102 | 102 | 96 |

EXAMPLE 3

The charge stock in this example was a solvent-refined oil having the following properties:

|  | Charge |
|---|---|
| Gravity, °API | 29.1 |
| Sp. Gravity | 0.8811 |
| Pour Point, °F. | >115 |
| K.V. @ 100° C., cs | 9.66 |

This stock was processed over prior art ZSM-5 catalyst, synthetic offretite, and offretite with 0.5% Pt dispersed thereon by impregnation with $Pt(NH_2)_4Cl_2$. The Ni/ZSM-5 and Pt/Offretite were sulfided in situ before the oil was charged. The results are shown in Table V.

TABLE V

| Catalyst | Ni/ZSM-5 | Offretite | Pt/Offretite |
|---|---|---|---|
| Pressure, psig | 400 | 400 | 400 |
| LHSV | 1.0 | 0.5 | 1.0 |
| H$_2$, SCF/bbl | 2700 | 2500 | 2500 |
| Avg. Cat. Temp., °F. | 585 | 700 | 700 |
| Liquid Product, °API | — | 30.5 | 30.5 |
| Material Balance, Wt. % | 97.6 | 101.6 | 101.3 |
| Yields, Wt. % (NLB) |  |  |  |
| C$_1$ + C$_2$ | 0.2 | 0.4 | 1.4 |
| C$_3$ | 4.1 | 7.0 | 9.6 |
| C$_4$ | 6.0 | 2.6 | 5.8 |
| C$_5$ | 4.0 | 0.4 | 0.9 |
| C$_6$-650° F. | 4.5 | 4.5 | 4.0 |
| 650° F.+ Lube | 81.2 | 85.1 | 78.6 |
| Lube Properties |  |  |  |
| Gravity, °API | 27.6 | 30.3 | 28.9 |
| Specific | 0.8894 | 0.8745 | 0.8822 |
| Pour Point, °F. | +25 | +50 | +25 |
| K.V. @ 40° C., cs | 112.0 | 83.63 | 94.33 |
| K.V. @ 100° C., cs | 11.5 | 10.1 | 10.8 |
| Viscosity Index | 88 | 101 | 98 |
| VI Adjusted to +20° F. pour | 87 | 95 | 97 |

EXAMPLE 4

The charge stock in this example was a straight run heavy gas oil having the following properties:

| Gravity, °API | 32.2 |
|---|---|
| Specific Gravity | 0.8644 |
| Pour Point, °F. | +50 |
| Vacuum Assay, °F. |  |
| IBP | 550 |
| 5% | 596 |
| 10 | 630 |
| 30 | 646 |
| 50 | 662 |
| 70 | 684 |
| 90 | 728 |
| 95 | 756 |

This stock was passed under different conditions over Zn offretite, made by exchange of NH$_4$ offretite with 0.5 N ZnCl$_2$/0.5 N NH$_4$Cl solution (final catalyst 2.2 wt.% Zn). The results and conditions are shown in Table VI.

TABLE VI

| Example No. | 4A | 4B | 4C | 4D |
|---|---|---|---|---|
| Pressure, psig | ← | 500 | → | → |
| LHSV | 16 | 16 | 8 | 4 |
| H$_2$, SCF/bbl | ← | 11,500 | → | → |
| Avg. Cat. Temp., °F. | 700 | 750 | 750 | 750 |
| Liquid Product, °API | 32.9 | 33.0 | 34.0 | 33.2 |
| Material Balance, Wt. % | — | 97.1 | — | 96.2 |
| Yields, Wt. % (NLB) |  |  |  |  |
| C$_1$ + C$_2$ | ↑ | 0.5 | ↑ | 0.7 |
| C$_3$ | ↑ | 3.8 | ↑ | 4.6 |
| C$_4$ | 7.4 | 7.1 | 19.2 | 10.1 |
| C$_5$ | ↓ | 6.4 | ↓ | 6.3 |
| C$_6$-550° F. | ↓ | 0.2 | ↓ | 0.9 |
| 550° F.+ Gas Oil | 92.6 | 82.0 | 80.8 | 77.4 |
| Gas Oil Pour Point, °F. | +25 | −10 | −20 | −55 |

What is claimed is:

1. In a process for manufacturing a refined lubricating oil stock having a V.I. of at least 85 and a pour point not greater than +25° F. from a waxy stock boiling within the range of from about 450° to about 1050° F., said process comprising catalytically dewaxing said waxy stock to a pour point not greater than +25° F., the improvement whereby effecting said dewaxing with increased selectivity, which comprises: contacting said waxy stock and hydrogen with a catalyst comprising synthetic offretite at a pressure of about 200 to 2000 psig, a LHSV of from 0.1 to 5.0, a temperature from about 500° to about 750° F.; and recovering a dewaxed oil stock with a pour point not greater than +25° F.

2. The process claimed in claim 1 wherein said waxy stock is a waxy solvent-refined stock.

3. The process claimed in claim 1 wherein said hydrogenation metal is selected from the group consisting of platinum, palladium, zinc, and a mixture of palladium and zinc.

4. The process claimed in claim 1 wherein said hydrogenation metal is nickel.

5. The process claimed in claim 3 or claim 4 wherein said contacting is effected at a temperature from about 500° to about 600° F. with fresh catalyst.

6. The process claimed in claim 1 wherein said waxy stock is partially solvent dewaxed prior to said contacting step.

7. The process claimed in claim 6 wherein said hydrogenation metal is selected from the group consisting of platinum, palladium, zinc and a mixture of palladium and zinc.

8. The process claimed in claim 6 wherein said hydrogenation metal is nickel.

9. The process claimed in claim 6 or claim 7 or claim 8 wherein said contacting is effected at a temperature from about 500° to about 600° F. with fresh catalyst.

10. The process claimed in claim 3 wherein said waxy-stock is a waxy solvent-refined stock.

11. The process claimed in claim 4 wherein said waxy stock is a waxy solvent-refined stock.

12. A process for treating a hydrocarbon oil feed which comprises contacting said feed at a temperature of 500° F. to 1100° F., a LHSV of 0.2 to 50, and a pressure of 15 to 3000 psig with a catalyst comprising synthetic offretite having the X-ray diffraction pattern set forth in Table I, and recovering a hydrocarbon oil having a reduced pour point, reduced cloud point, or reduced CFPP.

13. The process described in claim 12 wherein said contacting is done in the presence of hydrogen, said offretite catalyst is composited with a hydrogenation component, and said reaction conditions include a temperature of 500° to 900° F., a pressure of 200 to 2000 psig, a LHSV of 0.2 to 30, and a hydrogen circulation rate of 500 to 20,000 SCF/bbl.

14. The process described in claim 13 wherein said hydrogenation component is selected from the group consisting of platinum, palladium, zinc, and palladium-zinc.

15. The process described in claim 13 wherein said hydrogenation component comprises nickel.

* * * * *